US 7,113,802 B2

(12) United States Patent
Sliva

(10) Patent No.: US 7,113,802 B2
(45) Date of Patent: Sep. 26, 2006

(54) SYSTEM AND METHOD OF MESSAGING USING MIN ESCAPE CODES

(75) Inventor: Vladimir P. Sliva, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 106 days.

(21) Appl. No.: 10/447,094

(22) Filed: May 28, 2003

(65) Prior Publication Data

US 2004/0242245 A1 Dec. 2, 2004

(51) Int. Cl.
*H04Q 7/20* (2006.01)

(52) U.S. Cl. .................. 455/466; 455/411; 455/458; 455/435.1

(58) Field of Classification Search .............. 455/466, 455/565, 410–411, 435.1, 560–561, 458, 455/432.1–432.3, 433, 550.1, 552.1
See application file for complete search history.

(56) References Cited

U.S. PATENT DOCUMENTS 5,862,481 A * 1/1999 Kulkarni et al. .......... 455/432.2
6,081,705 A * 6/2000 Houde et al. ............... 455/411
6,795,425 B1 * 9/2004 Raith .......................... 370/345
2002/0168960 A1 * 11/2002 Jacobson et al. ........... 455/410
2003/0115454 A1 * 6/2003 Piikivi et al. ............... 713/155

* cited by examiner

*Primary Examiner*—Charles Appiah
*Assistant Examiner*—Marcos L. Torres

(57) ABSTRACT

A method providing communication between an MSC and a mobile terminal in a wireless communications system including using the 10 digit MIN identifier for identifying the mobile terminal in all messages requiring a mobile terminal identifier sent from the MSC via a base station to the mobile terminal and using the 15 digit MIN-based IMSI identifier for identifying the mobile terminal in all messages requiring a mobile terminal identifier sent from the mobile terminal via the base station to the MSC. The method can also include deploying the use of 15 digit MIN-based IMSI identifiers in one MSC at a time. The invention also includes a system for providing mobile terminal identification information in a wireless system. The system includes a mobile terminal capable of receiving and responding to messages using a 10 digit MIN for identifying the mobile terminal and sending messages having a MIN-based IMSI identifier for identifying the mobile terminal. The system also includes an MSC capable of receiving and processing messages from the mobile terminal having the MIN-based IMSI identifier and sending messages to the mobile terminal using the 10 digit MIN identifier.

4 Claims, 4 Drawing Sheets

30

32 — SENDING A MESSAGE TO THE WIRELESS TERMINAL USING THE 10 DIGIT MIN AS THE WIRELESS TERMINAL IDENTIFIER

34 — SENDING A MESSAGE USING A 15 DIGIT MIN-BASED IMSI AS THE WIRELESS TERMINAL IDENTIFIER FROM THE WIRELESS TERMINAL TO AN MSC

SYSTEM AND METHOD OF MESSAGING USING MIN ESCAPE CODES

FIELD OF THE INVENTION

The present invention relates in general to communication systems, and in particular to wireless communication systems that have the need for enabling system evolution from Mobile Identification Number (MIN) to a MIN based International Mobile Station Identity (IMSI) mobile numbers.

BACKGROUND OF THE INVENTION

In wireless communications system an identifier is associated with each wireless mobile terminal communicating in the system. The identifier has multiple uses, one use of the identifier is for delivering incoming calls to the wireless mobile terminal, also known as a mobile or a cellular phone. Other uses include, but are not limited to, the registration of the mobile terminal, authentication of the mobile terminal, billing for the mobile terminal, etc. In order to accommodate existing analog and Time Division Multiple Access (TDMA) mobile terminals, Code Division Multiple Access (CDMA) wireless communications systems in the United States can use a fixed 10 digit Mobile Identity Number (MIN) as the identifier.

Typically, mobile subscribers have roamed within their country borders. As wireless networks have grown and travel has increased, many subscribers want to take their mobile terminals with them increasing the need to support international roaming. International Roaming can be defined as allowing mobile subscribers to receive services at any international location away from their home system while roaming in a visited country.

To enable international roaming, the identifier in the mobile terminal is used to determine the location of the Home Location Register for the mobile terminal. With the ever increasing number of mobile terminals, 10 digits are not enough to uniquely identify a mobile terminal for use in all wireless communications systems worldwide. Since the 10 digit MIN is not globally unique, it does not allow for international roaming. Country codes have been used to identify the country of origin, however this only results in the reuse of the 10 digit MIN throughout the world further complicating the expansion of wireless communications.

Presently, many wireless communications systems are capable of using up to 15 digits for the mobile terminal identifier in an identification plan known as International Mobile Station Identity (IMSI). Mobile terminals can utilize one or both of two different types of IMSI identifiers as requested by the Mobile Switching Center (MSC).

One IMSI identifier, called MIN-based IMSI, uses a 15 digit identifier consisting of a MIN Escape Code (MEC) as the upper 5 digits and the MIN as the lower 10 digits. For example, every CDMA mobile terminal currently deployed in the United States has an MEC (and MIN) programmed into it. The other IMSI identifier type is called True-IMSI and it does not contain an MEC and thus is distinct from the MIN-based IMSI identifier. Since not all mobile terminals are capable of using a True-IMSI identifier, existing USA wireless communications systems currently utilize only 10 MIN digits as identifiers. In these systems, mobile terminals can use either the 10 digit MIN identifier or the MIN-based IMSI identifier. The MEC is not sent between systems in either case.

As an example, with CDMA systems, in accordance with CDMA air interface standards IS-95 and IS-2000, a wireless communication system can be configured in only one of two distinct ways. One way is for the wireless communication system to require the mobile terminal to send and receive 10 MIN digits as the identifier. The other way is for the mobile terminal to send and receive MIN-based IMSI digits as the identifier. In order to enable mobile terminals to participate in international roaming, it is desirable for wireless systems throughout the world to migrate to using MIN-based IMSI and/or True-IMSI identifiers.

However, a problem exists with using the MIN-based IMSI identifier. Not all mobile terminals are programmed with the correct MEC from the service provider, therefore these mobile terminals cannot be successfully paged using the MIN-based IMSI identifier. There is no network-wide standard mechanism guaranteeing that the mobile terminal would be paged with a MEC matching the MEC that the mobile terminal has been programmed with. This problem has delayed wireless communications systems' migration to the use of MIN-based IMSI identifiers. It is desirable to provide a way to utilize the MIN-based IMSI identifier despite these existing impediments.

SUMMARY OF THE INVENTION

According to the present invention, a new and improved system and method of providing communication between an MSC and a mobile terminal in a wireless communications system is provided.

In accordance with one aspect of the invention, the invention is a method including sending messages requiring a mobile terminal identifier from the MSC to the mobile terminal using only the 10 digit MIN identifier for identifying the mobile terminal, and sending the messages requiring a mobile terminal identifier from the mobile terminal to the MSC using the 15 digit MIN-based IMSI identifier including a 5 digit MIN Escape Code (MEC) and the MIN.

In accordance with a second aspect of the invention, the step of sending the messages to the mobile terminal includes paging the mobile terminal.

In accordance with another aspect of the invention, a system for providing mobile terminal identification information in a wireless system is provided. The system includes a mobile terminal capable of receiving and responding to messages having a 10 digit MIN for identifying the mobile terminal and sending messages having a 15 digit MIN-based IMSI identifier for identifying the mobile terminal, and a base station and MSC capable of receiving and processing messages from the mobile terminal having the 15 digit MIN-based IMSI identifier and sending messages to the mobile terminal having the 10 digit MIN identifier.

Other features, benefits and advantages of this invention will become apparent to those skilled in the art from the following detailed description of the preferred embodiments, when read in light of the accompanying drawings.

BRIEF DESCRIPTION OF THE DRAWINGS

The invention may take form in certain components and structures, preferred embodiments of which will be illustrated in the accompanying drawings wherein.

DETAILED DESCRIPTION OF THE INVENTION

Figure 1:
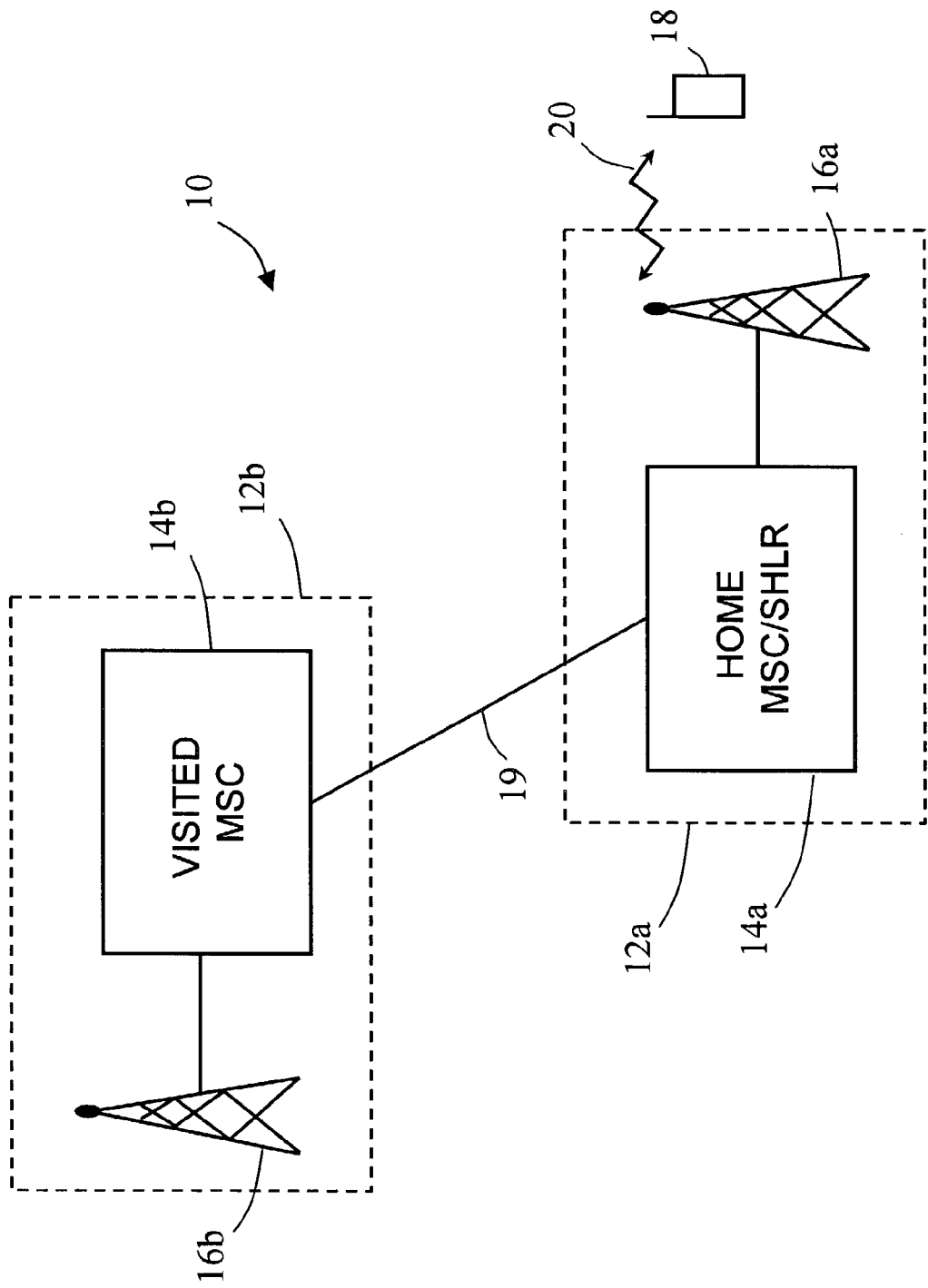
FIG. 1 illustrates a portion of a wireless communications network in accordance with the invention.

Referring now to FIG. 1 a portion of a wireless communications network is shown generally at 10. The network 10 includes a home system 12a having one or more base stations, one of which is shown at 16a, for communicating with wireless mobile terminals 18 over an air interface 20. The home system 12a also includes a home Mobile Switching Center (MSC) with a Home Location Register (HLR) for communicating with and/or controlling one or more of the base stations 16a or a home Stand Alone Home Location Register (SHLR) 14a.

The wireless mobile terminal 18 can be any suitable mobile terminal, also known as a mobile or a cellular phone, for communicating in a wireless network. The mobile terminal 18 can provide voice communications, and can be capable of sending and receiving data as well.

The network 10 also includes other systems 12, similar to the home system 12a, disposed at other locations and referred to herein as visited systems, one of which is shown at 12b. The visited system 12b includes one or more base stations 16b and one or more MSCs 14b similar to those in the home system 12a. The wireless communications systems 12 communicate with each other at 19 thereby enabling the mobile terminal 18 to move about, communicating with the network 10 by using other systems 12b besides the home system 12a. If the mobile's information is stored in SHLR, then the mobile could be viewed as always being in a visited system, that is always roaming, since it does not have a home MSC.

Figure 2:
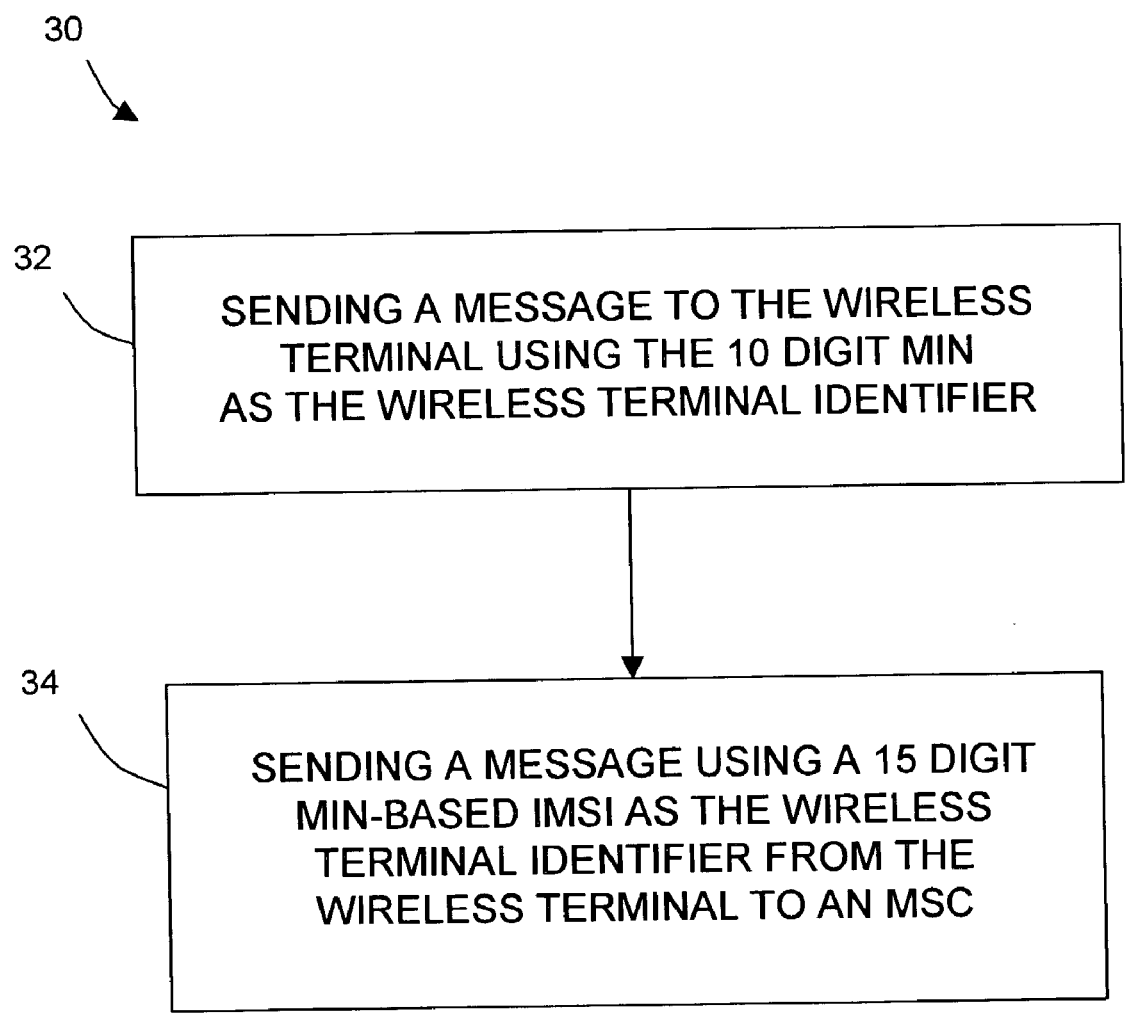
FIG. 2 illustrates steps of the invention.

Referring now to FIG. 2, a method of providing communication between an MSC and a mobile terminal in a wireless communications system is shown generally at 30. The method includes sending messages from the MSC 14a, 14b to the mobile terminal 18 using a 10 digit MIN identifier at 32. The method also includes sending a MIN-based IMSI identifier in a message from the mobile terminal 18 to an MSC 14a, 14b at 34. For example, the message sent in 34 can be a response to the message sent at 32.

The messages sent in steps 32 and 34 can be any suitable messages which use wireless mobile terminal identifiers. As described above, current IS-95 and IS-2000 standards mandate consistent use of same-length identifiers flowing in both directions between the mobile terminals and MSCs. That is, these standards mandate that either 10 digit MIN identifiers are sent in both directions, or that 15 digit MIN-based IMSI identifiers are sent in both directions. This invention introduces the intermediate step where the MSC 14a, 14b sends the mobile terminal 18 messages having the MIN digit identifier and the mobile terminal sends messages to the MSC having the MIN-based IMSI identifier.

The base stations 16a, 16b and MSCs 14a, 14b can be programmed to receive and process the MIN-based IMSI identifier from the mobile terminal even though the MSC sends a message to the mobile terminal utilizing the 10 digit MIN. The invention will enable the wireless provider to deploy international roaming IMSI capability utilizing the 15 digit identifiers. This can be done in manageable evolutionary steps, by programming one MSC at a time while guaranteeing uninterrupted service to every subscriber. Moreover, this way, the system can collect and compare the MIN Escape Codes actually programmed in the mobiles while allowing continued operation of all the mobiles, even those programmed incorrectly. This would enable providers to estimate the impact of turning MIN-based IMSI on and to potentially take appropriate actions such as reprogramming specific mobiles prior to turning MIN-based IMSI on for both over the air directions as shall be described in further detail below.

Figure 3:
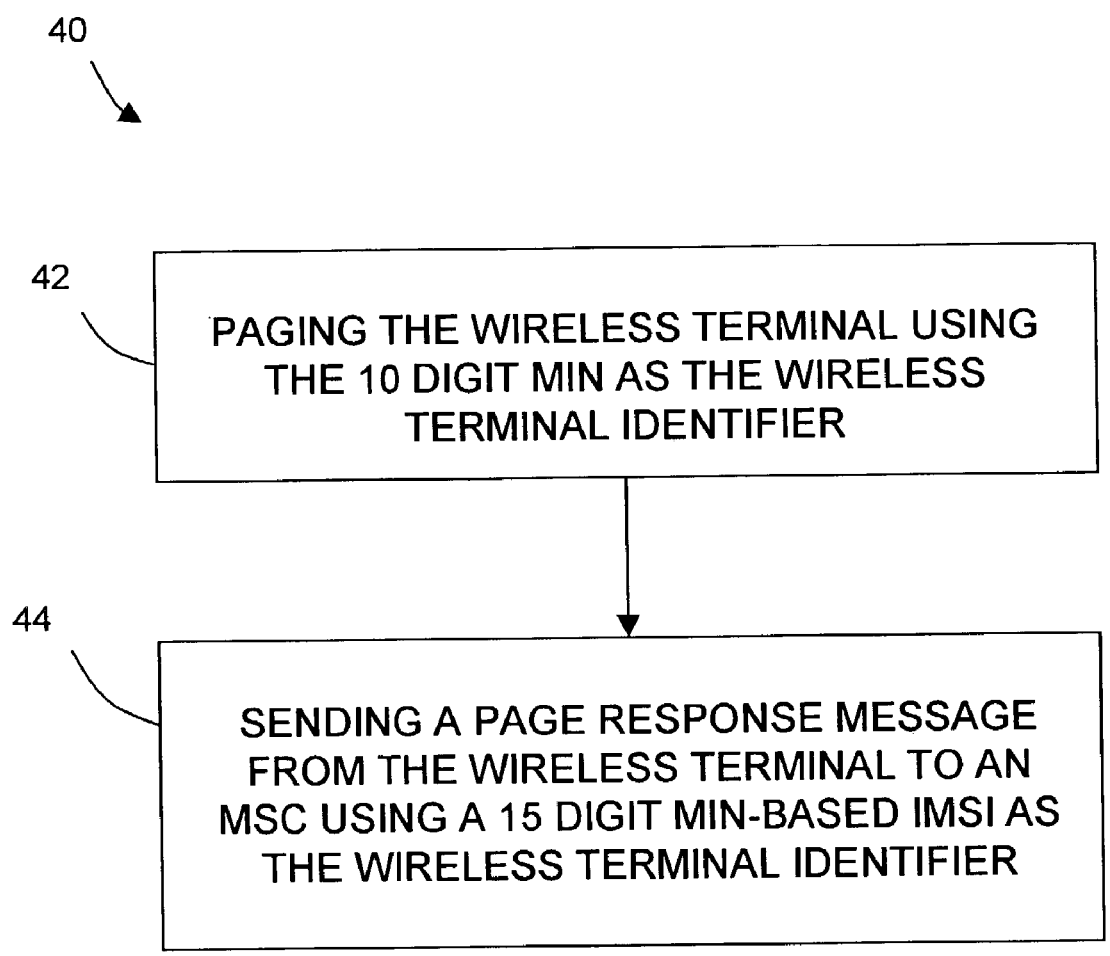
FIG. 3 illustrates steps of the invention.

As mentioned above, the messages can be any suitable messages that the mobile terminal identifier uses. For example, the mobile terminal 18 can be paged using the invention. Referring to FIG. 3, the invention can include paging the mobile terminal using a 10 digit MIN identifier at 42. The mobile terminal 18 is paged by sending a page message from the MSC 14a, 14b, via the base station 16a (16b), to the mobile terminal 18 which uses the MIN identifier. Typically the page message is sent over the paging channel.

The invention can also include sending a MIN-based IMSI identifier from the mobile terminal 18 to an MSC 14a, 14b at 44 via the base station 16a, 16b. Upon receiving the page message having the mobile terminal's 10 digit MIN, the mobile terminal 18 responds by sending a message to the MSC 14a, 14b of the system in which the mobile terminal is located having the 15 digit MIN-based IMSI identifier to identify the mobile terminal. The 15 digit MIN-based IMSI includes a 5 digit MIN Escape Code (MEC) and the 10 digit MIN. The response will be a known page response message.

When the mobile terminal 18 is in its home system 12a, the home MSC 14a directs the home base station 16a to page the mobile terminal with the 10 MIN digit identifier and the mobile terminal responds by sending the 15 digit MIN-based IMSI identifier back to the home base station 16a and home MSC or SHLR 14a. When the mobile terminal 18 is paged in a visited system, the visited MSC 14b directs the visited base station 16b to send the page message containing only the 10 MIN digits as the identifier. The mobile terminal responds by sending the 15 digit MIN-based IMSI identifier back to the visited base station 16b and visited MSC 14b.

Figure 4:
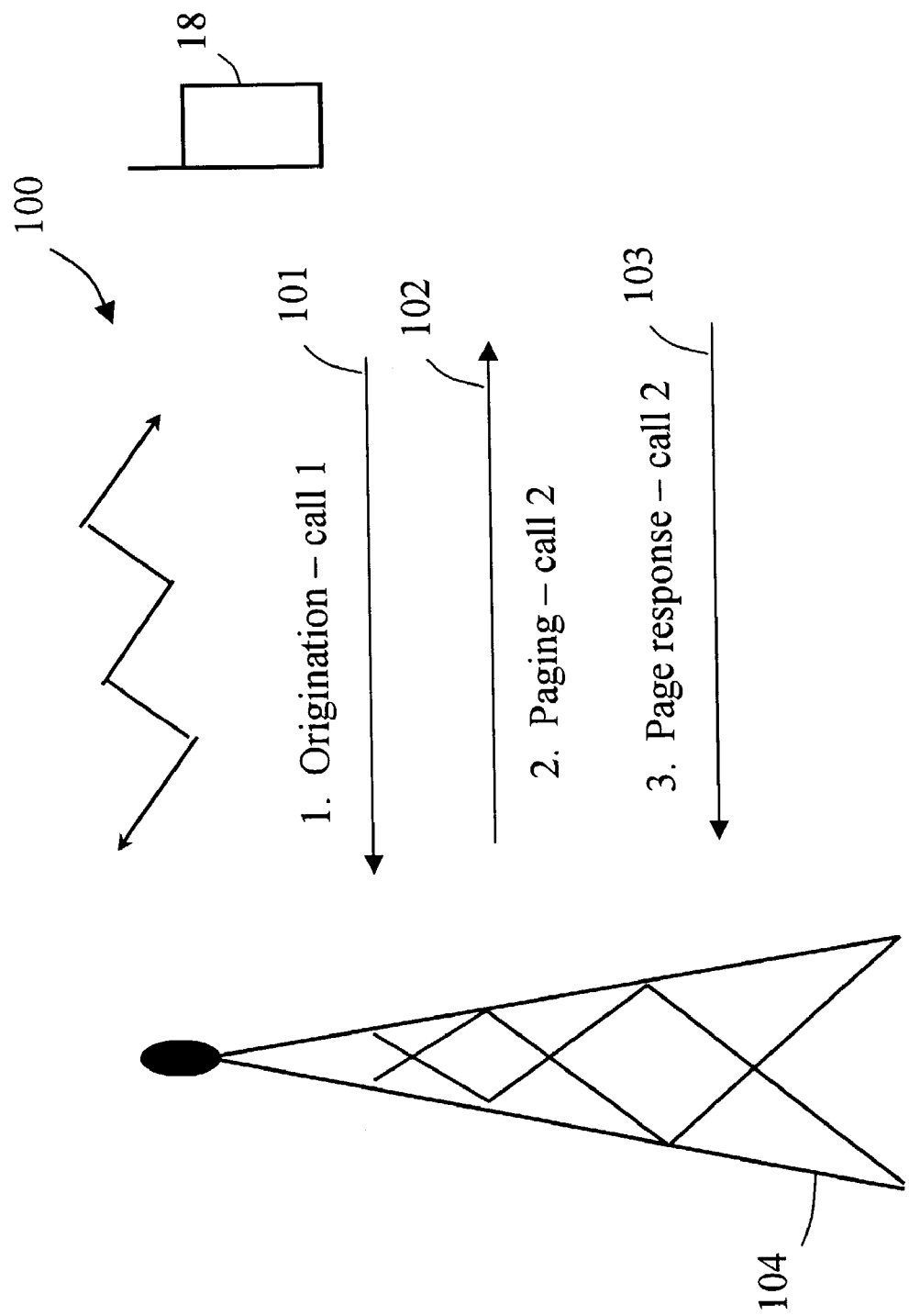
FIG. 4 illustrates examples of message flows in accordance with the invention.

FIG. 4 shows an example which highlights three actual messages that are contained in a message exchange between the mobile terminal 18 and an MSC. In a part of the network shown in 100, an origination message shown at 101 is sent from the mobile terminal 18 to the MSC when the subscriber originates a call. This message is sent to either the home MSC 14a or the visited MSC 14b and it uses the 15 digit MIN-based IMSI as the mobile terminal identifier. This message informs the provider(s) what MEC this particular mobile terminal 18 is actually programmed with. A registration message that the mobile terminal 18 may send upon powering up to the system 12a, 12b behaves in a similar manner.

The provider(s) can use this information to correct incorrectly programmed MECs before the MECs are sent in both directions between the MSC and the base stations. Using the 15 digit MIN-based IMSI in this manner allows the provider (s) to collect the 5 digit MECs from both the mobile terminals that are in their home systems and roaming mobile terminals without crippling termination to roamers. This is especially applicable to those mobile terminals having MECs which are unknown due to incorrect mobile programming or when networks cannot convey that information yet. The provider(s) can compare the collected MECs with the MECs stored in, for example a database according to the standards and/or the government agencies and/or the provider's data. The provider(s) can determine which collected MECs are incorrect and which mobile terminals have incorrect MECs programmed into them. Using this information, the providers can correct the incorrectly programmed MECs in any suitable known manner, either manually or over-the-air. The MECs can be corrected before international roaming would actually start, at which point both MEC and MIN would start to be sent and respected in both directions between the MSC and the base station as presently dictated by the standards.

A paging message shown at 102 is used when the subscriber is being called. The paging message 102 uses only the 10 digit MIN as the mobile terminal identifier. The paging message 102 is sent from an MSC to the mobile terminal 18 on the paging channel. The mobile terminal 18 responds with a page response message shown at 103 even if the MEC programmed in the mobile terminal 18 is not correct. Like the origination message 101, this message uses the MIN-based IMSI mobile terminal identifier programmed in the mobile terminal 18.

The invention has been described with reference to preferred embodiments. Obviously, modifications and alterations will occur to others upon reading and understanding the preceding specification. It is intended that the invention be construed as including all such modifications and alterations insofar as they come within the scope of the appended claims or the equivalents thereof.

I claim:

1. A method of providing communication between a mobile terminal and a wireless communications system including a Mobile Switching Center (MSC) and a base station comprising:

using a 10 digit Mobile Identity Number (MIN) identifier for identifying the mobile terminal in messages using a mobile terminal identifier sent from the MSC to the mobile terminal;

using a 15 digit MIN-based International Mobile Station Identity (IMSI) identifier for identifying the mobile terminal in messages using a mobile terminal identifier sent from the mobile terminal to the MSC, wherein the 15 digit MIN-based IMSI includes a 5 digit MIN Escape Code (MEC) and the MIN;

collecting 5 digit MECs programmed in mobile terminals communicating directly with their home systems;

collecting 5 digit MEC programmed in mobile terminals visiting visited systems;

comparing the collected MECs with the MECs stored in the system;

determining which collected MECs are incorrect;

determining which mobile terminals have incorrect MECs; and correcting the MECs for mobile terminals having incorrect MECs.

2. A method of providing communication between Mobile Switching Centers (MSCs) and mobile terminals in a wireless communications system comprising:

sending messages from the MSCs to the mobile terminals using 10 digit identifiers for identifying the mobile terminals, the 10 digit identifiers being Mobile Identity Numbers;

sending messages from the mobile terminals to the MSCs using 15 digit identifiers for identifying the mobile terminals, the 15 digit identifiers being Mobile Identity Number-based International Mobile Station Identities including 5 digit Mobile Identity Number Escape Codes and the Mobile Identity Numbers;

collecting Mobile Identity Number Escape Codes programmed in the mobile terminals; and correcting incorrect Mobile Identity Number Escape Codes in mobile terminals while providing uninterrupted service to the mobile terminals.

3. The method defined in claim 2 wherein the correcting step is performed before sending both the Mobile Identity Number Escape Codes and the Mobile Identity Numbers in the mobile terminal identifiers sent in both directions between the MSCs and mobile terminals.

4. The method defined in claim 2 wherein the messages sent in the step of sending messages from the mobile terminals to the MSCs are in response to the messages sent in the step of sending messages from the MSCs to the mobile terminals.

* * * * *